(12) United States Patent
Horley

(10) Patent No.: US 9,361,204 B2
(45) Date of Patent: Jun. 7, 2016

(54) GENERATING TRACE DATA INCLUDING A LOCKUP IDENTIFIER INDICATING OCCURRENCE OF A LOCKUP STATE

(71) Applicant: ARM LIMITED, Cambridge (GB)

(72) Inventor: John Michael Horley, Cambridge (GB)

(73) Assignee: ARM Limited, Cambridge (GB)

( * ) Notice: Subject to any disclaimer, the term of this patent is extended or adjusted under 35 U.S.C. 154(b) by 229 days.

(21) Appl. No.: 13/769,992

(22) Filed: Feb. 19, 2013

(65) Prior Publication Data

US 2014/0237300 A1 Aug. 21, 2014

(51) Int. Cl.
*G06F 11/34* (2006.01)
*G06F 11/36* (2006.01)

(52) U.S. Cl.
CPC .......... *G06F 11/348* (2013.01); *G06F 11/3476* (2013.01); *G06F 11/3636* (2013.01); *G06F 11/3466* (2013.01)

(58) Field of Classification Search
CPC ............ G06F 11/3024; G06F 11/0787; G06F 11/0766; G06F 11/3466; G06F 11/3476; G06F 11/3636
USPC .................. 714/38.1, 38.12, 38.13, 38.14
See application file for complete search history.

(56) References Cited

U.S. PATENT DOCUMENTS

| | | | | |
|---|---|---|---|---|
| 5,748,880 A * | 5/1998 | Ito | .................... | G06F 11/0709 714/2 |
| 6,493,834 B1 * | 12/2002 | Bates et al. | ................ | 714/38.13 |
| 6,694,425 B1 * | 2/2004 | Eickemeyer | .................. | 712/216 |
| 6,823,478 B1 * | 11/2004 | Prologo et al. | ............. | 714/38.14 |
| 7,360,114 B2 * | 4/2008 | Malin et al. | ...................... | 714/20 |
| 7,562,263 B1 * | 7/2009 | Engelbrecht et al. | ........... | 714/49 |
| 8,122,290 B2 * | 2/2012 | Walton | ................ | G06F 11/0712 714/26 |
| 8,327,193 B2 * | 12/2012 | Enarson | ................ | G06F 11/073 714/42 |
| 8,510,603 B2 * | 8/2013 | Bendig | ......................... | 714/38.1 |
| 8,589,927 B2 * | 11/2013 | Williams | ............ | G06F 11/3466 718/100 |
| 2004/0102949 A1 | 5/2004 | Agarwala | | |
| 2006/0184769 A1 * | 8/2006 | Floyd et al. | .................... | 712/216 |
| 2006/0184770 A1 * | 8/2006 | Bishop et al. | ................. | 712/216 |
| 2007/0260931 A1 * | 11/2007 | Aguilar-Macias et al. | ..... | 714/39 |
| 2008/0140895 A1 * | 6/2008 | Baker et al. | .................... | 710/262 |
| 2009/0193297 A1 * | 7/2009 | Williams et al. | ................. | 714/37 |
| 2010/0281303 A1 * | 11/2010 | Cates | .............................. | 714/33 |
| 2010/0313061 A1 * | 12/2010 | Huth | .................... | G06F 11/073 714/2 |
| 2011/0004443 A1 | 1/2011 | Horikawa | | |

FOREIGN PATENT DOCUMENTS

JP 2-59834 2/1990
WO WO 2012/106066 8/2012

OTHER PUBLICATIONS

Wikipedia's XML version from Feb. 17, 2013 http://en.wikipedia.org/w/index.php?title=XML&oldid=538774626.*
GB Search Report dated May 20, 2014 in GB 1321217.0.

* cited by examiner

*Primary Examiner* — Joseph Schell
(74) *Attorney, Agent, or Firm* — Nixon & Vanderhye P.C.

(57) ABSTRACT

A data processing apparatus has processing circuitry for executing program instructions and trace circuitry for generating trace data indicating processing activities of the processing circuitry. The trace circuitry may detect a lockup state of the processing circuitry in which the processing circuitry does not make forward progress of execution of the program instructions. In response to detecting the lockup state, the trace circuitry may include in the trace data a lockup identifier indicating that the lockup state has occurred.

19 Claims, 3 Drawing Sheets

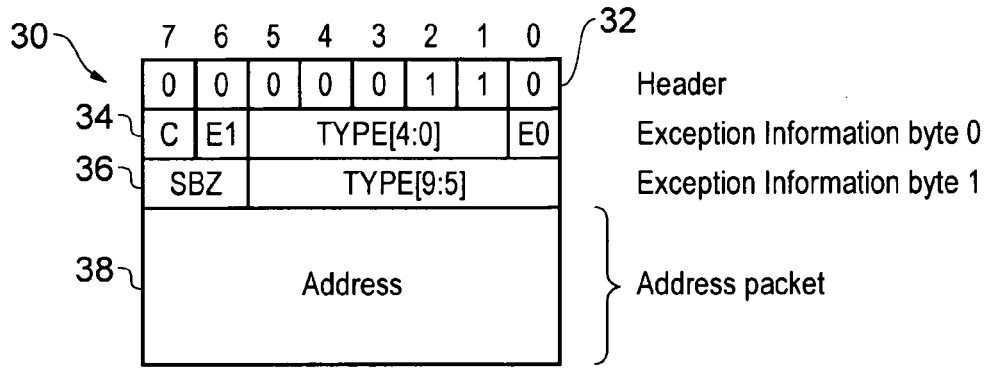

FIG. 2

| TYPE[9:0] | Exception | TYPE[9:0] | Exception | TYPE[9:0] | Exception |
|---|---|---|---|---|---|
| b00_0000_0000 | *Reserved* | b00_0001_0000 | IRQ0 | b00_0010_000 to b00_0010_1111 | *Reserved for IMPDEF exceptions* |
| b00_0000_0001 | Processor Reset | b00_0001_0001 | IRQ1 | | |
| b00_0000_0010 | NMI | b00_0001_0010 | IRQ2 | | |
| b00_0000_0011 | HardFault | b00_0001_0011 | IRQ3 | b00_0011_000 to b01_1111_1111 | *Reserved* |
| b00_0000_0100 | MemManage | b00_0001_0100 | IRQ4 | | |
| b00_0000_0101 | BusFault | b00_0001_0101 | IRQ5 | | |
| b00_0000_0110 | UsageFault | b00_0001_0110 | IRQ6 | b10_0000_0000 to b10_0000_0111 | *Reserved* |
| b00_0000_0111 | *Reserved* | b00_0001_0111 | IRQ7 | | |
| b00_0000_1000 | *Reserved* | b00_0001_1000 | Debug Halt | | |
| b00_0000_1001 | *Reserved* | b00_0001_1001 | Lazy FP push | b10_0000_1000 to b11_1110_1111 | IRQ8 to IRQ495 |
| b00_0000_1010 | *Reserved* | b00_0001_1010 | Lockup | | |
| b00_0000_1011 | SVC | b00_0001_1011 | *Reserved* | | |
| b00_0000_1100 | Debug Monitor | b00_0001_1100 | *Reserved* | b11_1111_0000 to b11_1111_1111 | *Reserved* |
| b00_0000_1101 | *Reserved* | b00_0001_1101 | *Reserved* | | |
| b00_0000_1110 | PendSV | b00_0001_1110 | *Reserved* | | |
| b00_0000_1111 | SysTick | b00_0001_1111 | *Reserved* | | |

FIG. 3

GENERATING TRACE DATA INCLUDING A LOCKUP IDENTIFIER INDICATING OCCURRENCE OF A LOCKUP STATE

BACKGROUND TO THE INVENTION

1. Field of the Invention

The present invention relates to the field of data processing. More particularly, the invention relates to generating trace data indicative of processing activities of processing circuitry.

2. Background to the Invention

A processor may be provided with a trace unit for monitoring processing activity of the processor and generating trace data indicating the processing activity. The trace data generated by the trace unit can be analyzed to identify problems in the operation of the processing circuitry.

SUMMARY OF THE INVENTION

Viewed from one aspect, the present invention provides a data processing apparatus comprising:
processing circuitry configured to execute program instructions; and
trace circuitry configured to generate trace data indicative of processing activities of the processing circuitry;
wherein the trace circuitry is configured to detect a lockup state of the processing circuitry in which the processing circuitry does not make forward progress of execution of the program instructions; and
in response to detecting the lockup state of the processing circuitry, the trace circuitry is configured to include in the trace data a lockup identifier indicating that the lockup state has occurred.

A processor may have a lockup state in which no forward progress of execution of program instructions can be made. For example, the lockup state may occur if a serious fault makes it impossible to carry on with execution. Existing trace units do not detect the occurrence of the lockup state. Some trace units stop generating trace data while the processor is in the lockup state, and so the trace stream generated by such trace units would merely indicate a stream of instructions which were executed before and after the lockup state occurred, without any information that would help to determine whether the lockup state occurred, when it occurred or why it occurred. In other systems, during the lockup state the processor may repeatedly attempt to execute the same instruction over and over again. The trace unit may detect a series of branches to the same instruction, and generate a corresponding series of branch trace packets. This approach wastes trace bandwidth in generating many identical branch trace packets, which can cause other trace data to be lost if older trace data packets are discarded to make way for the newer branch trace packets, making it difficult to identify what triggered the lockup state.

To address these issues, the present technique provides trace circuitry which detects the lockup state of the processing circuitry in which the processing circuitry cannot make forward progress of execution of program instructions. When the lockup status is detected, the trace circuitry includes in the trace data a lockup identifier indicating that the lockup state has occurred. By including in the trace stream an explicit indication of the lockup state, it is possible to determine from the generated trace data when the lockup state occurred and deduce from other trace data surrounding the lockup state indication why the lockup state was triggered. This is not possible in existing trace architectures which do not recognize the importance of detecting the occurrence of the lockup state.

While in the lockup state, the processing circuitry may operate in different ways. Some systems may stop executing program instructions when in the lockup state. For example, the system may wait for an external signal (e.g. from a debugger or processor reset mechanism) to bring the processing circuitry out of the lockup state before continuing with execution. In other examples, the system may attempt to repeatedly execute at least one program instruction while in the lockup state, which if unsuccessful will not lead to any forward progress. If the problem causing the lockup state is addressed, then eventually the at least one program instruction will be executed successfully and the system can then exit the lockup state. In this way, the system may be able to recover from lockup itself without an external input. Alternatively, a system may operate using a combination of these two schemes in which the processing circuitry enters a sleep condition during the lockup state and then periodically wakes up to attempt to execute a program instruction before returning to the sleep state if the program instruction cannot be executed correctly.

The processing circuitry may enter the lockup state in response to a fault condition occurring in the data processing apparatus. There are many possible causes for the fault condition which triggers lockup. One example is corruption of the exception vector table, which identifies the locations in memory of exception handling routines corresponding to different exceptions. If the exception vector table gets corrupted, then on taking an exception a memory fault may occur when attempting to fetch the instructions of the corresponding exception handling routine, and an exception triggered in response to the memory fault may fail in a similar way. If the processor cannot execute any exception handling routines to resolve the fault, then forward progress of execution may be impossible and so the processing circuitry can enter the lockup state to await resolution of the fault. Other causes of the lockup state may include bus errors, memory errors arising when stacking or unstacking data from registers, or faults triggered when taking or returning from exceptions. The lockup state may detected by the trace circuitry in various ways. For example, the processing circuitry may include some internal state indicating whether the processing circuitry is in the lockup state and the trace circuitry could monitor this state to detect the lockup state. The internal state could be a portion of a status register in the processor, for example.

In response to the detected lockup state, the trace circuitry may generate a single trace data packet including the lockup identifier. By generating only one trace data packet including an explicit indication of the lockup state, trace bandwidth in a trace buffer or trace output port for handling the generated trace data is conserved and it is easier to determine from the trace stream when and why the lockup condition occurred in comparison to previous trace techniques. The cause of the lockup condition can be deduced from the trace packets surrounding the trace packet including the lockup identifier.

The occurrence of exception conditions may also be traced by the trace circuitry. The processing apparatus may have exception control circuitry configured to detect occurrence of an exception condition and, in response to occurrence of the exception condition, may trigger the processing circuitry to take the exception by executing a corresponding exception handling routine. When an exception is taken, the trace circuitry may detect this and may generate an exception trace data packet including an exception identifier field for identifying the detected exception condition. The trace data can then be used to reconstruct the processing activities of the processor, including what type of exception occurred, and at which point of program execution the exception occurred.

The lockup identifier may be specified using the exception identifier field of the exception trace data packet. Hence, the same trace data packet format may be used for tracing both exceptions and the lockup state of the processing circuitry. The lockup state may effectively be indicated as a kind of exception with a special "lockup" value of the identifier in the exception identifier field. By reusing the format of the exception trace data packet to also indicate occurrence of the lockup state, the present technique can be implemented efficiently with little modification to a trace scheme for tracing exception events.

The lockup identifier may be included in the trace data at any time when the processing circuitry is in the lockup state. However, typically the lockup identifier would be included in the trace stream when the processing circuitry enters the lockup state. Optionally, the trace circuitry may also detect the processing circuitry exiting the lockup state and in response to detecting an exit from the lockup state may include a lockup exit identifier in the trace data. The exit from the lockup state may be triggered by an external signal or the occurrence of an exception condition for example. For example, the external signal may be a reset signal for resetting the processor, and the resetting of the processor may be traced by the trace circuitry using the same exception trace data packet format discussed above, with an identifier identifying the processor reset specified in the exception identifier field. Alternatively, exit from the lockup state may not need to be traced explicitly in the trace stream, and instead the exit from lockup could be inferred from trace data indicating that forward progress of program execution is once more being made.

In addition to the lockup identifier, the trace circuitry may also include in the trace data an indication of a current execution point of the processing circuitry when the lockup state was detected. The indication of the current execution point may for example comprise an instruction address (for example, the value of the program counter when the lockup state was detected). The execution point indication does not have to be a precise indication of the current execution point. For example, the indication could identify a block of instructions, indicating that the lockup state could have occurred when executing any of that block of instructions. The execution point indication need not be the full instruction address, and may for example indicate the relative position of an instruction relative to an instruction for which a preceding data packet was generated. For example, in some systems, trace data packets may be generated in response to each branch instruction executed by the processing circuitry, with it being implicit that between two successive branch instructions all the intervening instructions were executed. Hence, the indication of the current execution point at the time of the lockup state could comprise a relative indication of the instruction address with respect to the address of the most recent branch instruction.

Having generated the trace data, the trace data circuitry may output the trace data to at least one of a trace buffer for storing the trace data within the data processing apparatus, a trace port for outputting the trace data outside the data processing apparatus, and an external apparatus for analyzing the trace data.

Viewed from another aspect, the present invention provides a trace unit for monitoring processing activities of processing circuitry for executing program instructions, the trace unit comprising:

trace circuitry configured to generate trace data indicative of the processing activities of the processing circuitry;

wherein the trace circuitry is configured to detect a lockup state of the processing circuitry in which the processing circuitry does not make forward progress of execution of the program instructions; and in response to detecting the lockup state of the processing circuitry, the trace circuitry is configured to include in the trace data a lockup identifier indicating that the lockup state has occurred.

Viewed from a further aspect, the present invention provides a data processing apparatus comprising:

processing means for executing program instructions; and trace means for generating trace data indicative of processing activities of the processing means;

wherein the trace means is configured to detect a lockup state of the processing means in which the processing means does not make forward progress of execution of the program instructions; and in response to detecting the lockup state of the processing means, the trace means is configured to include in the trace data a lockup identifier indicating that the lockup state has occurred.

Viewed from yet another aspect, the present invention provides a method of generating trace data indicative of processing activities of processing circuitry for executing program instructions, the method comprising:

detecting a lockup state of the processing circuitry in which the processing circuitry does not make forward progress of execution of the program instructions; and in response to detecting the lockup state of the processing circuitry, generating trace data including a lockup identifier indicating that the lockup state has occurred.

The above, and other objects, features and advantages of this invention will be apparent from the following detailed description of illustrative embodiments, which is to be read in connection with the accompanying drawings.

BRIEF DESCRIPTION OF THE DRAWINGS

FIG. 2 illustrates an example of an exception trace data packet generated by the trace circuitry;

FIG. 3 schematically illustrates an example encoding of an exception type field of the exception trace data packet.

DESCRIPTION OF EXAMPLE EMBODIMENTS

Figure 1:
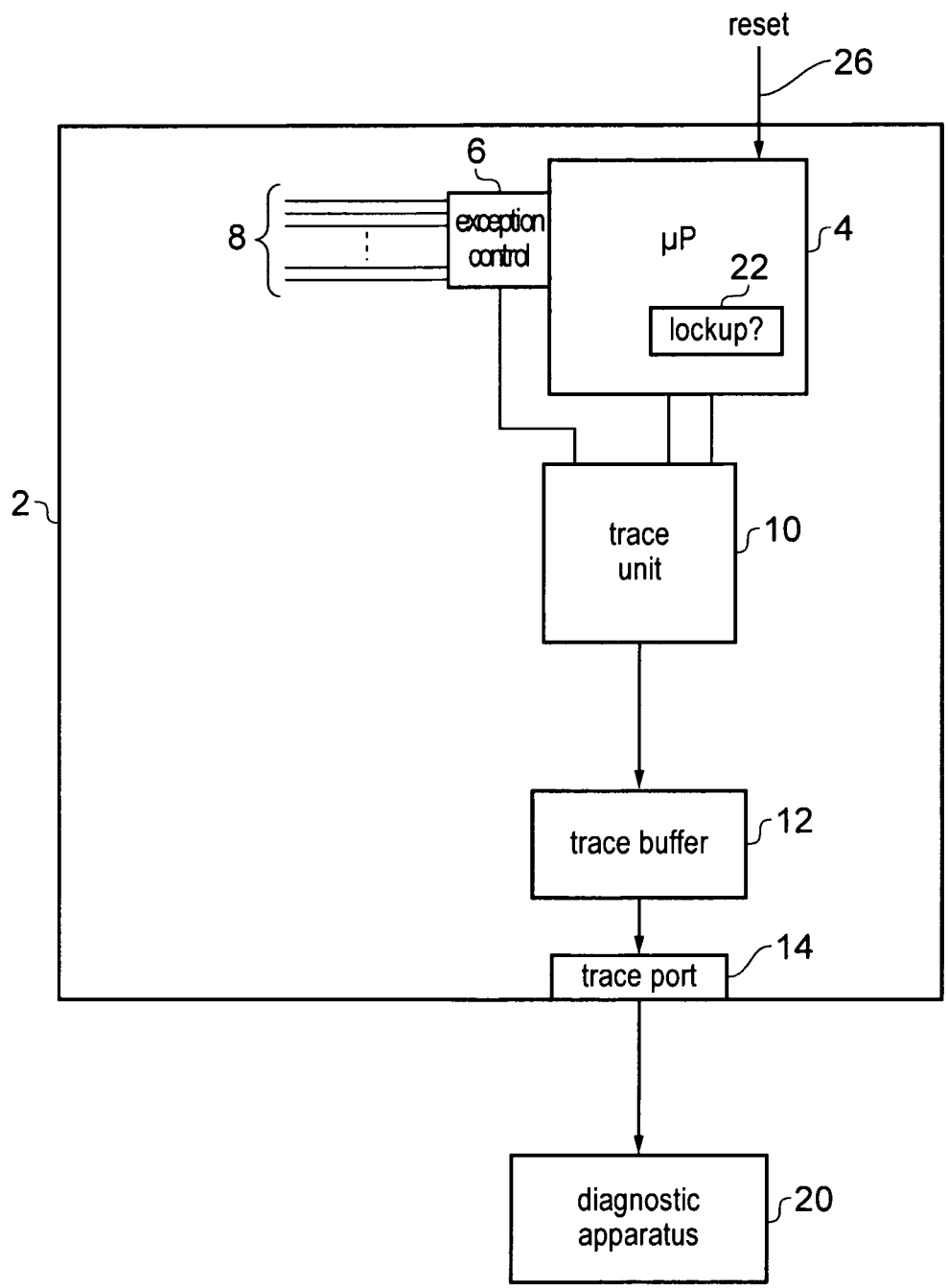
FIG. 1 schematically illustrates a data processing apparatus having a trace unit for generating trace data representing processing activity of processing circuitry.

FIG. 1 schematically illustrates a data processing apparatus 2 comprising a microprocessor 4 for executing program instructions. The data and instructions processed by the processor 4 may be fetched from a cache or memory (not illustrated in FIG. 1). The processor 4 has exception control circuitry 6, which may be part of the processor 4 or may be separate from the processor 4. If an exception condition (e.g. an interrupt) occurs, then the exception control circuitry 6 controls the processing circuitry 4 to execute a corresponding exception handling routine. The exception control circuitry 6 receives several exception signals 8 from external devices or other parts of the processing apparatus 2, including from within the processor 4. Each exception signal 8 corresponds to a particular type of exception and is asserted to request that the processing circuitry 4 performs a corresponding exception handling routine. The exception control circuitry 6 may prioritize the exceptions so that if multiple exception signals 8 are asserted simultaneously then one of the exceptions is selected for processing by the processor 4 while the other exceptions remain pending. The exception signals may indicate various conditions including, for example, device errors, memory faults, bus faults, events triggered by a debugger, or various exceptions defined by software executing on the processor 4. It will be appreciated that in practice the data processing apparatus 2 may have many other elements which have not been illustrated in FIG. 1 for conciseness.

A trace unit 10 monitors operation of the processor 4, the exception control circuitry 6, and other devices which may be included in the apparatus 2. The trace unit 10 generates trace data indicating various information about the processing activity of the processor 4, and outputs the trace data to a trace buffer 12 for storing the trace data on-chip. The data from the trace buffer 12 can be output to external devices via a trace port 14. For example, a diagnostic apparatus 20, such as a personal computer or other computing device, may receive the trace data stream and analyse the trace data to identify conditions of interest or problems arising during the operation of the data processing apparatus 2. For example, the trace stream may include various trace packets indicating instructions being executed by the processor 4, exceptions taken by the exception control circuitry 6, data stored to memory or fetched from memory, or the processor 4 entering particular modes of operation or processing states. While FIG. 1 shows an example where the apparatus 2 has both a trace buffer 12 and a trace port 14, in other examples, one or other of these may be omitted.

The processor 4 has a lockup state in which forward progress is not possible. The processor 4 has a lockup state storage location 22 indicating whether the processor 4 is in the lockup state. The storage location 22 could be a portion of a register within the processor 4 for example. The processor 4 may enter the lockup state in response to an external signal or in response to certain fault conditions arising within the apparatus 2 which prevent correct execution of instructions. For example, the processor 4 may enter a lockup state if a fault occurs while starting to execute an exception handling routine. Also, the processor may enter the lockup state if a hard fault, which cannot be resolved using software, occurs. Similarly, bus errors occurring when transferring data over a bus may trigger the lockup state, or stack errors occurring when transferring data to or from a stack within memory, may cause the lockup state to occur.

While in the lockup state, the processor may either suspend processing of all program instructions or may periodically or repeatedly attempt to execute a same instruction. To exit the lockup state, a reset signal 26 may be input to the apparatus to trigger the processor 4 to resume execution of program instructions, or the apparatus 2 may itself be able to resolve the fault which triggered the lockup state and then exit the lockup state when the fault is resolved.

As the lockup state typically indicates that there is a problem (for example a problem in the processor 4, the data stored in memory, or the software being executed), it is desirable to determine when the lockup condition occurs and why. The trace unit 10 monitors the lockup state storage location 22 of the processor 4 to detect when the lockup condition occurs. In response to detecting the lockup condition, the trace unit 10 generates a trace packet including a lockup identifier indicating that the lockup state has occurred. When analyzing the output trace stream, the diagnostic apparatus 20 can determine from this trace packet the point of execution at which the lockup state occurred and, using surrounding trace data in the trace stream, can determine a likely cause of the lockup state.

FIG. 2 shows an example of a trace packet 30 generated to indicate the lockup condition. In this example, the exception trace packet format that is used for indicating that exceptions have been taken is also used for indicating that the lockup state has occurred. It will be appreciated that in other examples separate trace packet formats could be used for indicating occurrence of the lockup state and an exception respectively.

The exception trace packet 30 has an 8-bit header 32 indicating that this trace packet 30 is an exception trace packet. The trace packet also has two bytes of exception information 34, 36 and an address packet 38. The bytes 34, 36 of exception information include an exception type field TYPE[9:0] identifying the type of exception condition or whether the lockup state has occurred. FIG. 3 shows an example encoding of the type field TYPE[9:0]. Different values of the exception type field indicate different kinds of exceptions as shown in FIG. 3. In this example, the value b00_0001_1010 indicates the lockup state and other values indicate different types of exceptions (clearly, other encoding schemes can also be used). Hence, the lockup state is indicated as a type of exception condition.

The address packet 38 indicates the current point of execution at which the exception or the lockup state occurred. This may be indicated as an instruction address or partial instruction address. The address may be derived from the program counter of the processor 4. The address may be an absolute address or a relative address indicating the displacement of the current execution point from the address of a preceding branch instruction. The exception trace data packet 30 also includes an extension field C which indicates whether the second byte 36 of exception information is present. The second byte 36 of exception information extends the range of the exception type field from 5 bits to 10 bits. For some types of exceptions, for which the upper 5 bits of the exception identifier are zero, the second byte 36 of exception information can be omitted and the upper 5 bits of the type field can be assumed to be zero. The second byte of information 36 can be included when an exception identifier is required which has a bit value of 1 in one of the upper 5 bits TYPE[9:5]. Using this technique, the amount of trace data can be compressed where possible. For greatest compression, the most common types of exceptions can be indicated using the exception identifiers for which the second byte of exception information 36 is not required.

The first byte of exception information 34 also includes some fields E0, E1 which contain indications of whether any instructions were executed since the previous branch instruction but before the occurrence of the relevant exception condition or the lockup state. If these fields indicate that no more instructions were executed since the previous branch instruction, then the address packet 38 may be omitted to reduce the amount of trace data and avoid using as much bandwidth in the trace buffer 12 or trace port 14. The second byte of exception information 36 also includes some "should be zero" values SBZ which are reserved and are always set to zero. If more information needs to be included in the trace packet then this could be encoded in the "should be zero" field.

Hence, by treating the lockup state as a type of exception and tracing occurrence of the lockup state using a single trace packet including an explicit lockup identifier, analysis of the stream of trace data can determine when the lockup state occurred and why. This is much more efficient than previous implementations which either provided no information to help determine that a lockup state occurred, or generated a large stream of many trace packets wasting trace bandwidth.

Figure 4:
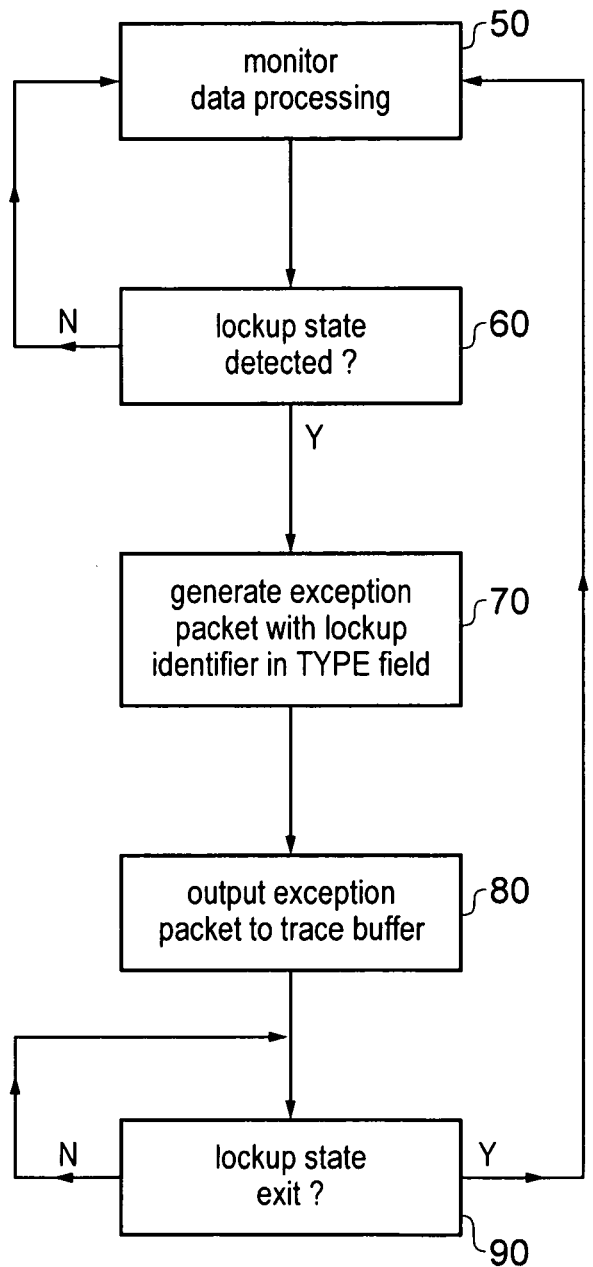
FIG. 4 illustrates a method of generating trace data including an indication that a lockup state of the processing circuitry has occurred.

FIG. 4 illustrates a method of generating trace data using the trace unit 10. At step 50, the trace unit 10 monitors data processing in the processing circuitry 4 or any other processing units such as further processors, coprocessors or graphics processing units. At step 60, the trace unit 10 determines whether the lockup state has been detected using the lockup state register 22 of the processor 4. If the lockup state is not detected then the method returns to step 50 where monitoring of data processing continues. The monitoring at step 50 may include generation of trace packets to indicate various features of the processing. Any generated trace packets may be stored in the trace buffer 12 or output via the trace port 14.

If the lockup state is detected by the trace unit at step 60, then at step 70 the trace unit 10 generates an exception trace data packet with the type field TYPE[9:0] specifying the lockup identifier (b00_0001_1010 in the example of FIG. 3). As the upper 5 bits of the type field are 0 for the lockup condition, the second exception information byte 36 can be omitted. The address field 38 is set to indicate the execution point at which the lockup state was detected. At step 80, the exception packet generated by the trace unit 10 is output to the trace buffer 12 or trace port 14. When data is retrieved from the trace buffer 12 or port 14, it can be analysed by the diagnostic apparatus 20.

At step 90, the trace unit 10 determines whether the processor 4 has exited the lockup state. The exit from the lockup state may be triggered by an external signal (e.g. a reset signal for resetting the processor to an initial state) or by an exception event in the processor, or may occur when the problem which caused the lockup state has been resolved. If the processor 4 has not yet exited the lockup state, then step 90 is repeated until an exit from the lockup state is detected. When the trace unit 10 detects the processor 4 exiting the lockup state, the trace unit 10 returns to monitoring the data processing at step 50. Optionally, the trace unit 10 could include a lockup exit identifier in the trace stream in response to detecting the exit from the lockup state.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. A data processing apparatus comprising:
    processing circuitry configured to execute program instructions; and
    trace circuitry configured to generate trace data indicative of processing activities of the processing circuitry;
    wherein the trace circuitry is configured to detect a lockup state of the processing circuitry in which the processing circuitry does not make forward progress of execution of any program instructions; and
    in response to detecting the lockup state of the processing circuitry, the trace circuitry is configured to include in the trace data a lockup identifier indicating that the lockup state has occurred;
    wherein the trace circuitry is configured to detect the processing circuitry exiting the lockup state; and
    in response to detecting the processing circuitry exiting the lockup state, the trace circuitry is configured to include in the trace data a lockup exit identifier or trace data indicating that forward progress of program execution is once more being made.

2. The data processing apparatus according to claim 1, wherein in the lockup state, the processing circuitry is configured to halt execution of the program instructions.

3. The data processing apparatus according to claim 1, wherein in the lockup state, the processing circuitry is configured to repeatedly attempt to execute at least one program instruction.

4. The data processing apparatus according to claim 1, wherein the processing circuitry is configured to enter the lockup state in response to a fault condition occurring in the data processing apparatus.

5. The data processing apparatus according to claim 1, wherein in response to detecting the lockup state of the processing circuitry, the trace circuitry is configured to generate a single trace data packet including the lockup identifier.

6. The data processing apparatus according to claim 1, comprising exception control circuitry configured to detect occurrence of an exception condition and, in response to occurrence of the exception condition, to trigger the processing circuitry to perform exception handling processing corresponding to the detected exception condition.

7. The data processing apparatus according to claim 6, wherein in response to the exception control circuitry triggering the processing circuitry to perform the exception handling processing, the trace circuitry is configured to generate an exception trace data packet including an exception identifier field for specifying an exception identifier identifying the detected exception condition.

8. The data processing apparatus according to claim 7, wherein in response to detecting the lockup state of the processing circuitry, the trace circuitry is configured to generate said exception trace data packet with the lockup identifier specified in the exception identifier field.

9. The data processing apparatus according to claim 1, wherein the processing circuitry is configured to exit the lockup state in response to at least one of an external signal and occurrence of an exception condition.

10. The data processing apparatus according to claim 1, wherein in response to detecting the lockup state of the processing circuitry, the trace circuitry is configured to include in the trace data an indication of a current execution point of the processing circuitry when the lockup state was detected.

11. The data processing apparatus according to claim 1, wherein the trace circuitry is configured to output the trace data to at least one of:
    (i) trace buffer;
    (ii) a trace port; and
    (iii) an external apparatus for analysing the trace data.

12. The data processing apparatus according to claim 1, wherein the processing circuitry comprises a storage location indicative of whether the processing circuitry is in the lockup state.

13. The data processing apparatus according to claim 12, wherein the trace circuitry is configured to monitor the storage location to detect occurrence of the lockup state.

14. The data processing apparatus according to claim 1, wherein the processing circuitry is configured to enter the lockup state in response to a fault which cannot be resolved by execution of an exception handling routine.

15. The data processing apparatus according to claim 1, wherein the processing circuitry is configured to enter the lockup state in response to a memory fault occurring when attempting to fetch instructions of an exception handling routine.

16. The data processing apparatus according to claim 1, wherein the trace data comprises a stream of trace packets indicative of program instructions executed by the processing circuitry.

17. A trace unit for monitoring processing activities of processing circuitry for executing program instructions, the trace unit comprising:
   trace circuitry configured to generate trace data indicative of the processing activities of the processing circuitry;
   wherein the trace circuitry is configured to detect a lockup state of the processing circuitry in which the processing circuitry does not make forward progress of execution of any program instructions; and
   in response to detecting the lockup state of the processing circuitry, the trace circuitry is configured to include in the trace data a lockup identifier indicating that the lockup state has occurred;
   wherein the trace circuitry is configured to detect the processing circuitry exiting the lockup state; and
   in response to detecting the processing circuitry exiting the lockup state, the trace circuitry is configured to include in the trace data a lockup exit identifier or trace data indicating that forward progress of program execution is once more being made.

18. A data processing apparatus comprising:
   processing means for executing program instructions; and
   trace means for generating trace data indicative of processing activities of the processing means;
   wherein the trace means is configured to detect a lockup state of the processing means in which the processing means does not make forward progress of execution of any program instructions; and
   in response to detecting the lockup state of the processing means, the trace means is configured to include in the trace data a lockup identifier indicating that the lockup state has occurred;
   wherein the trace means is configured to detect the processing means exiting the lockup state; and
   in response to detecting the processing means exiting the lockup state, the trace means is configured to include in the trace data a lockup exit identifier or trace data indicating that forward progress of program execution is once more being made.

19. A method of generating trace data indicative of processing activities of processing circuitry for executing program instructions, the method comprising:
   detecting a lockup state of the processing circuitry in which the processing circuitry does not make forward progress of execution of any program instructions; and
   in response to detecting the lockup state of the processing circuitry, generating trace data including a lockup identifier indicating that the lockup state has occurred; and
   in response to detecting the processing circuitry exiting the lockup state, including in the trace data a lockup exit identifier or trace data indicating that forward progress of program execution is once more being made.

* * * * *